United States Patent Office 3,441,529
Patented Apr. 29, 1969

3,441,529
CARBONACEOUS CEMENT
Laurence W. Tyler, Strongsville, Ohio, assignor to Union Carbide Corporation, a corporation of New York
No Drawing. Filed Nov. 16, 1966, Ser. No. 594,669
Int. Cl. C09j *3/16;* C08g *37/06*
U.S. Cl. 260—19          22 Claims

ABSTRACT OF THE DISCLOSURE

A thermosetting cement of superior strength for bonding together carbonaceous structures, particularly those structures used as refractory linings in metallurgical equipment such as cupolas and blast furnaces, comprising a mixture of an oil, a soap, finely-divided carbonaceous particles, furfuryl alcohol, a phenolic novolac resin, and a hardening agent for the phenolic resin.

---

This invention relates to a thermosetting cement of superior strength for bonding together carbonaceous structures, particularly those structures used as refractory linings in metallurgical equipment such as cupolas and blast furnaces.

Throughout the metallurgical industry carbonaceous blocks and bricks and other structural shapes of carbon and graphite are commonly employed as refractory linings in metallurgical equipment wherein molten materials are processed, such as in furnaces employed in the production of items such as pig iron, ferro-alloys, phosphorus, and the like. In order to prevent penetration of such molten materials between the carbonaceous blocks or bricks or other structural shapes which make up the lining of such furnaces, and the ultimate destruction of both the lining and the furnace, the joints between the structural forms of carbon must be strong and durable.

In accordance with the instant invention a cement for joining carbonaceous bodies is provided which is capable of producing a bond between the bodies which approximates the strength of the bodies themselves. Advantage can be taken of the superior bond produced by this novel cement to produce truly monolithic carbon structures in large size. These monolithic carbon structures have important industrial applications, e.g., the installation of a truly monolithic carbon bottom into a large industrial metallurgical furnace eliminates the necessity of separately installing and keying together the carbon blocks which make up the bottom of the furnace in order to prevent their floating into the molten bath when the furnace is in operation, resulting in important savings in time and costs.

The carbonaceous cement of the instant invention comprises a mixture of an oil, a soap, finely-divided carbonaceous particles, furfuryl alcohol, a phenolic resin of the novolac type, and a hardening agent for the phenolic resin. This mixture, which can be prepared in any convenient manner, has a shelf life of about 3 days at 100° F., 15 days at 70° F., and 6 months at 40° F.

While the cement itself has a limited shelf life, the oil, finely-divided carbonaceous particles, phenolic resin, and phenolic resin hardener can be intermixed and stored indefinitely, as can the soap and furfuryl alcohol. For this reason, where extended storage is necessary before the cement is to be employed, it is desirable to store the ingredients as two separate mixtures, the first comprising the oil, finely-divided carbonaceous particles, phenolic resin and phenolic resin hardener, and the second comprising the soap and furfuryl alcohol. When the need arises, the two mixtures can be blended and the cement applied.

The mixture of the oil, finely-divided carbonaceous particles, phenolic resin, and phenolic resin hardener can be prepared by blending the carbonaceous particles, phenolic resin and phenolic resin hardener together in any conventional manner, e.g. in a tumbling barrel, spraying the oil into the resulting mixture, and further blending the mixture until the oil has been incorporated therein and a substantially homogeneous blend formed.

The mixture of soap and furfuryl alcohol can be prepared by heating the soap up to a temperature of about 100° C. to liquify it, and then dissolving the molten soap in the furfuryl alcohol. Upon cooling, the soap remains dissolved in the furfuryl alcohol as a stable solution which can be stored until it is ready to be mixed with the mixture of oil, finely-divided carbonaceous particles, phenolic resin, and phenolic resin hardener. The two mixtures, one liquid and the other essentially solid, can be readily mixed at room temperature, either manually or mechanically.

After the two mixtures have been thoroughly blended to produce a substantially homogeneous mixture, it is applied to the surfaces of the carbonaceous bodies to be joined and allowed to harden. Most preferably the cement is applied to clean surfaces in a thickness of from about $\frac{1}{32}''$ to about $\frac{1}{8}''$. While hardening of the cement can be effected at room temperature, it is usually preferable to heat the cement to hasten curing of the phenolic resin to the thermoset state. Temperatures of from about 80° C. to about 150° C., preferably from about 90° C. to about 110° C., are suitable for most resins with curing times of from about 2 hours to about 10 hours, usually from about 3 hours to about 5 hours, generally required at such temperatures. Lower temperatures, of course, require longer curing times. After the cement has hardened sufficiently, heating above the carbonization temperature of the cement, e.g. above about 500° C., causes the cement to carbonize and produce a permanent bond. Carbonization, of course, should be effected in a substantially oxygen-free atmosphere and at a rate which will insure that volatiles are driven off at a rate which will not cause rupturing of the joint. When the cement is used to join together the blocks which make up the lining of a metallurgical furnace or hearth, the heat from the start-up of the furnace or hearth can be used to initially harden the cement, with permanent bonding between the blocks taking place as the temperature rises above the carbonization temperature of the cement.

Any phenolic resin of the novolac type can be employed in the carbonaceous cement of the instant invention. Such resins are produced by condensing phenols, such as phenol itself, m-cresol, p-cresol, o-cresol, 3,5-xylenol, 3,4-xylenol, 2,5-xylenol, p-ethylphenol, p-tert-butylphenol, p-tert-amylphenol p-tert-octylphenol, p-phenylphenol, 2,3,5-trimethylphenol, resorcinol, and the like, with aldehydes such as formaldehyde, furfuraldehyde, acetaldehyde, and like. Preferably, a phenol-formaldehyde resin is employed in the cement of the instant invention.

Curing of the novolac resin to the thermoset state can be effected by means of any hardening agent conventionally employed to cure such resins. Such hardening agents are conventionally materials such as paraformaldehyde or hexamethylenetetramine which upon the application of heat generate formaldehyde which reacts with the resin and causes it to crosslink. The novolac resin is suitably employed in the cement in an amount of from about 8 parts by weight to about 21 parts by weight, most preferably from about 12 parts by weight to about 17 parts by weight. The hardener for the resin is employed in an amount sufficient to cure such resin to the thermoset state, i.e., in an amount which will provide sufficient formaldehyde to react with and crosslink the resin.

The furfuryl alcohol employed in the carbonaceous cement of the instant invention is believed to react with the phenolic resin when it is cured and serves as a modifying agent for the resin. The use of furfuryl alcohol is critical as it has been found that bonds having the high strength obtainable through the use of this modifying agent cannot be produced when other modifying agents are substituted for furfuryl alcohol. Thus, for example, when furfuraldehyde is employed in place of furfuryl alcohol in otherwise identical compositions, bonds are produced having only about half the strength of the bonds produced using the furfuryl alcohol. Suitably, the furfuryl alcohol is employed in an amount of from about 15 parts by weight to about 50 parts by weight, most preferably from about 25 parts by weight to about 40 parts by weight.

Any form of finely-divided carbon or graphite can be employed in the carbonaceous cement of the instant invention. Suitable carbonaceous materials include graphite flour, petroleum coke flour, Thermatomic Black (black made by the passage of natural gas over hot refractories), pitch coke flour, calcined lampblack flour, and the like. Amounts of the carbonaceous flour of from about 20 parts by weight to about 85 parts by weight, preferably from about 55 parts by weight to about 85 parts by weight, are suitable. Most preferably, the carbonaceous flour is a mixture of graphite and Thermatomic Black, with the graphite flour being present in an amount of from about 40 parts by weight to about 70 parts by weight and the Thermatomic Black being present in an amount of from about 15 parts by weight to about 35 parts by weight.

Any combustible oil can be employed in the carbonaceous cement of the instant invention. In order to avoid volatilizing the oil while curing of the phenolic resin is effected, it is desirable that the oil have a boiling point higher than the curing temperature of the resin. For this reason, oils having a boiling point above about 150° C., preferably above about 200° C., are most useful, with oils having a boiling point above about 250° C. being particularly preferred. While petroleum-base oils, such as paraffin oils, aromatic oils and asphaltic oils, are preferred, other oils, such as animal and vegetable oils, can also be employed. Among the petroleum-base oils, the paraffin oils are preferred. Illustrative of the animal and vegetable oils which can be employed are palm kernel oil, olive oil, peanut oil, beef tallow oil, cottonseed oil, corn oil, soybean oil, and the like. Amounts of oil of from about 1 part by weight to about 5 parts by weight, preferably from about 2 parts by weight to about 4 parts by weight, are suitable.

While the soap employed in the carbonaceous cement of the instant invention can be any of the metallic or quaternary amonium salts of the fatty acids, cements prepared with either the neutral or acid quaternary ammonium soaps are more resistant to oxidation than cements prepared with the more common metallic soaps, so that the use of the non-metallic soaps are preferred. Such non-metallic soaps are prepared by the reaction of a fatty acid with ammonia or an amine. The most preferred non-metallic soap is produced by the reaction of a fatty acid with triethanolamine. The fatty acids employed, like the fatty acids employed to produce metallic soaps, generally contain from about 10 to about 24 carbon atoms, and can be either saturated or unsaturated. Among the saturated fatty acids which can be employed are capric, lauric, myristic, palmitic, stearic, arachidic, behenic, tetracosanoic, and the like. Typical unsaturated fatty acids include palmitoleic, oleic, linoleic, arachidonic, cetoleic, erucic, selacholeic, and the like. Amounts of soap of from about 1 part by weight to about 10 parts by weight, preferably from about 3 parts by weight to about 7 parts by weight, are suitable.

At times it may be desirable to incorporate other ingredients into the cement of the instant invention to impart certain desirable properties thereto. Thus, for example, a small amount of finely-divided silica, for example from about 0.1 part by weight to about 2 parts by weight, imparts desirable non-sintering properties to the cement, and can be employed if desired. Similarly, other additives can be employed to obtain special effects.

The following example is set forth for purposes of illustration so that those skilled in the art may better understand this invention, and it should be understood that it is not to be construed as limiting this invention in any manner. The terms "carbon" and "carbonaceous" as used throughout this specification may include all forms of the material, both graphitic and non-graphitic.

EXAMPLE 1

Fifty-five (55) parts by weight of 60 graphite flour (60 percent through 200 mesh screen), twenty-five (25) parts by weight of Thermatomic Black, fourteen (14) parts by weight of a phenol-formaldehyde novolac resin, two and one-half (2.5) parts by weight of hexamethylenetetramine, and one-half (0.5) part by weight of a finely-divided silica were blended together in a tumbling barrel for about ten minutes. Three (3) parts by weight of a purified petroleum-base oil (distillable at temperatures above 285° C.) was then sprayed into the resulting mixture and blending was continued for an additional fifteen minutes.

Five (5) parts by weight of a soap prepared by reacting triethanolamine with a mixture of fatty acids (containing about 55 percent by weight of oleic acid) was heated to a temperature of about 100° C. to liquify it, and then dissolved in thirty-two (32) parts by weight of furfuryl alcohol. The resulting solution was then cooled and admixed with the mixture prepared in the manner described above to form a substantially homogeneous blend. The blend was applied to the largest surface area of each of two carbon blocks 12″ x 6″ x 4″ in size. The coated surfaces were then adjoined and the blocks were allowed to stand at room temperature for 24 hours. At the end of this time, the blocks were heated at a temperature of 100° C. for 4 hours to cure the phenolic resin to the thermoset state and harden the cement.

Heating of the blocks was then continued for four hours in an inert atmosphere at a temperature of 260° C. The blocks were then cooled to room temperature and samples were cut about the joint between the blocks to a size of 1¾″ square. The joints between these samples were tested and found to have an average flexural strength of 738 p.s.i. Samples prepared in the same manner using a cement in which the furfuryl alcohol had been replaced with furfuraldehyde were found to have an average flexural strength of only 328 p.s.i.

Similar samples were cut from blocks prepared in the same manner but carbonized to a final temperature of 1400° C., and the joints between the samples were tested for flexural strength. The joints prepared using the cement containing furfuryl alcohol had an average flexural strength of 343 p.s.i., while the joint prepared using the cement containing furfuraldehyde had an average flexural strength of only 138 p.s.i.

What is claimed is:
1. A cement for bonding together carbonaceous structures consisting essentially of a substantially homogeneous mixture of from about 1 part by weight to about 10 parts by weight of a soap, from about 20 parts by weight to about 85 parts by weight of finely-divided carbonaceous particles, from about 15 parts by weight to about 50 parts by weight of furfuryl alcohol, from about 8 parts by weight to about 21 parts by weight of a phenolic novolac resin a hardening agent for the phenolic resin in an amount sufficient to cure the phenolic resin to the thermoset state, and from about 1 part by weight to about 5 parts by weight of a combustible oil having a boiling point higher than the curing temperature of the phenolic resin.

2. A cement as in claim 1 wherein the oil is a petroleum-base oil.

3. A cement as in claim 2 wherein the hardening agent is hexamethylenetetramine.

4. A cement as in claim 3 wherein the phenolic resin is a phenol-formaldehyde resin.

5. A cement as in claim 4 wherein the soap is a quaternary ammonium salt of a fatty acid.

6. A cement as in claim 5 wherein the soap is a quaternary ammonium salt of a fatty acid produced by the reaction of a fatty acid with triethanolamine.

7. A cement as in claim 6 wherein the finely-divided carbonaceous particles are a mixture of graphite and carbon black, with the graphite being present in an amount of from about 40 parts by weight to about 70 parts by weight and the carbon black being present in an amount from about 15 parts by weight to about 35 parts by weight.

8. A cement as in claim 1 wherein the oil has a boiling point above about 200° C.

9. A cement as in claim 8 wherein the oil is a petroleum-base oil.

10. A cement as in claim 9 wherein the hardening agent is hexamethylenetetramine.

11. A cement as in claim 10 wherein the phenolic resin is a phenol-formaldehyde resin.

12. A cement as in claim 11 wherein the soap is a quaternary ammonium salt of a fatty acid.

13. A cement as in claim 12 wherein the soap is a quaternary ammonium salt of a fatty acid produced by the reaction of a fatty acid with triethanolamine.

14. A cement as in claim 13 wherein the finely-divided carbonaceous particles are a mixture of graphite and carbon black, with the graphite being present in an amount of from about 40 parts by weight to about 70 parts by weight and the carbon black being present in an amount from about 15 parts by weight to about 35 parts by weight.

15. A cement as in claim 1 wherein the oil has a boiling point above about 250° C. and is present in an amount of from about 2 parts by weight to about 4 parts by weight, the soap is present in an amount of from about 3 parts by weight to about 10 parts by weight, the finely-divided carbonaceous particles are present in an amount of from about 55 parts by weight to about 85 parts by weight, the furfuryl alcohol is present in an amount of from about 25 parts by weight to about 40 parts by weight, and the phenolic resin is present in an amount of from about 12 parts by weight to about 17 parts by weight.

16. A cement as in claim 15 wherein the oil is a petroleum-base oil.

17. A cement as in claim 16 wherein the hardening agent is hexamethylenetetramine.

18. A cement as in claim 17 wherein the phenolic resin is a phenol-formaldehyde resin.

19. A cement as in claim 18 wherein the soap is a quaternary ammonium salt of a fatty acid.

20. A cement as in claim 19 wherein the soap is a quaternary ammonium salt of a fatty acid produced by the reaction of a fatty acid with triethanolamine.

21. A cement as in claim 20 wherein the finely-divided carbonaceous particles are a mixture of graphite and carbon black, with the graphite being present in an amount of from about 40 parts by weight to about 70 parts by weight and the carbon black being present in an amount from about 15 parts by weight to about 35 parts by weight.

22. A cement as in claim 21 wherein finely-divided silica is present in amount of from about 0.1 part by weight to about 2 parts by weight.

References Cited

UNITED STATES PATENTS 2,970,121   1/1961   Schmittberger _____ 260—829

DONALD E. CZAJA, *Primary Examiner.*

WILLIAM E. PARKER, *Assistant Examiner.*

U.S. Cl. X.R.

260—829, 33,6